United States Patent [19]

Gossman et al.

[11] Patent Number: 5,423,523

[45] Date of Patent: Jun. 13, 1995

[54] INTEGRATED HYDRAULIC MOUNT FOR ACTIVE VIBRATION CONTROL SYSTEM

[75] Inventors: William E. Gossman, Silver Spring; Michael J. Burke, Annapolis, both of Md.

[73] Assignee: Noise Cancellation Technologies, Inc., Linthicum, Md.

[21] Appl. No.: 506,202

[22] Filed: Apr. 9, 1990

[51] Int. Cl.$^6$ .......................... F16F 9/50; F16M 13/00
[52] U.S. Cl. ............................. 267/140.15; 267/218; 248/550
[58] Field of Search ................. 267/140.1 R, 140.1 A, 267/140.1 AE, 140.1 E, 136, 218-220; 188/378-380; 248/562, 636, 550, 559; 180/300, 312, 902

[56] References Cited

U.S. PATENT DOCUMENTS

| 4,650,170 | 3/1987 | Fukushima | 248/562 X |
| 4,679,778 | 7/1987 | Tabata et al. | 267/219 X |
| 4,687,188 | 8/1987 | Knurek et al. | 267/140.1 A |
| 4,709,779 | 12/1987 | Takehara | 267/140.1 E X |
| 4,743,000 | 5/1988 | Karnopp | 267/218 |
| 4,789,023 | 12/1988 | Grant | 248/562 X |
| 4,869,474 | 9/1989 | Best et al. | 180/300 X |
| 4,878,188 | 10/1989 | Ziegler, Jr. et al. | 364/724.01 |
| 5,052,510 | 10/1991 | Gossman | 248/550 X |

FOREIGN PATENT DOCUMENTS

| 2120355 | 11/1983 | United Kingdom | 267/219 |
| 8808091 | 10/1988 | WIPO | 267/140.1 AE |
| 8905930 | 6/1989 | WIPO | 267/140.1 A |

OTHER PUBLICATIONS

Rao, Singiresu S. *Mechanical Vibrations* 2d ed., Addison-Wesley Pub. Co., 1990, pp. 144-146.
Thomson, William T. *Theory of Vibration with Applications* 3rd ed., Prentice Hall, New Jersey, pp. 65-67.

*Primary Examiner*—Josie A. Ballato
*Attorney, Agent, or Firm*—James W. Hiney

[57] ABSTRACT

An actively controlled mount system to control vibration which permits static forces from a machine while decoupling the transmission of dynamic vibrational forces. The mount system provides a reduction of force losses from a first generating area to a second force applying area to actively control vibrations of a vibrating element. These force losses are minimized due to minimization of the mass and velocity of fluid pumped by pumping the fluid through short large cross-sectional area passageways. The device provides for channeling of the forces to the vibrating element in a uniaxial direction and constrains the application of forces in non-working directions.

5 Claims, 4 Drawing Sheets

INTEGRATED HYDRAULIC MOUNT FOR ACTIVE VIBRATION CONTROL SYSTEM

FIELD OF THE INVENTION

The present invention relates generally to the field of machine and engine mounts, and more particularly, to an actively-controlled vibration reducing mount.

BACKGROUND OF THE INVENTION

Figure 1:
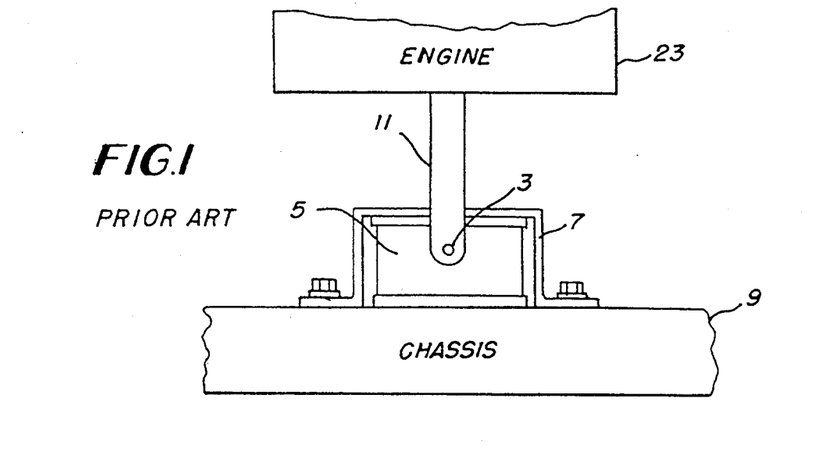
FIG. 1 schematically illustrates a basic engine mount.

Many machines such as engines, motors, compressors and the like, are connected to suitable supports via intermediate mounts. An hydraulic example of such a mount may be seen in FIG. 1. Engine 23 is supported by bracket 11 and working bushing 3. The bracket 11 is further connected, via the working bushing 3, to hydraulic mount 5. Hydraulic mount 5 is mounted onto a chassis 9 via a mount bracket 7. Such mounts are intended to isolate vibration, but must also be capable of supporting the weight of machine, engine, or motor and the like, and damping low-frequency forces of the machine relative to the support. These motions are caused by normal operations including variations in engine speed, load torque reaction etc. The design of such mounts is largely dependent upon the nature and types of forces transmitted between the machine and the support. In some applications such as gas-powered automobile engines, the mount may simply be an elastomeric block.

In other cases, such as a diesel engine, the mount may take the form of a spring and damper arranged in parallel with one another. There is unwanted forced transmissability in passive mounts due to the mount resonance and in the case of a parallel spring and damper, the damper inadvertently acts as an unwanted force transmitter at higher frequencies.

To overcome this problem, it has been proposed to add "active" elements to such machine mounts. Theoretically, such elements can be selectively controlled so as to effectively cancel the net dynamic forces transmitted through the spring and damper due to vibratory motion of the engine. It has conventionally been proposed to install an electromagnetic force motor, or "shaker" in parallel with the spring and damper of each mount. An accelerometer mounted on the support in the vincity of the mount, supplies a signal to a controller which operates the "shaker" to produce an output force of like magnitude but 180 degrees out of phase with respect to the sum of the vibration forces transmitted through the spring and damper, such that the net force transmitted through the suspension is substantially reduced to zero.

A, further conventional system for actively controlling the vibrational forces exerted from an engine is disclosed in an article entitled "Open-Loop Versus Closed-Loop Control for Hydraulic Engine Mounts" by Graf et al and published in S.A.E. publication number 880075, published in 1988. The hydraulic mount system includes a rubber structure capped by thin metal plates at both ends. A metal bushing carries the load of the engine and is situated between two compliant fluid reservoirs. Motion of the metal bushing is controlled via a close-coupled servo-valve to deliver pressurized hydraulic fluid alternately to opposing reservoirs within the mount. This permits an active mount to impart either an attractive or repulsive force between the power train and chassis.

Recently there have been attempts to drive a bidirectional hydraulic mount directly with a controllable pump mechanism. Such an approach avoids the need for a separate bidirectional servo-valve and pump. Such an approach was described in published PCT application WO89/05930 published Jun. 29, 1989. In this approach the pump was physically separated from the mount and hydraulically connected thereto with hydraulic lines.

The above approach has not proved particularly successful as it was not possible to transmit enough force from the pump to the mount. Additionally, separate mounts and pumps were necessary.

In the system of this PCT application, a spring and damper are arranged in parallel with one another between the masses. The damper has first and second fluid-containing chambers, continuously communicating with one another through a restricted orifice. The PCT application attempts to use the pump to create a net pressure differential across the orifice to reduce the dynamic force attributable to such relative motion between the masses and transmitted through the spring-and-damper. The pump is arranged such that a attempt is made to substantially cancel the dynamic force transmitted through both of the spring-and-damper attributable to such relative motion between the masses.

However, though the conventional systems previously mentioned idealistically appear to provide systems in which a fluid displacement generating device produces a desired pressure drop across an orifice of such polarity, magnitude and phase, so as to oppose and reduce certain forces transmitted through a spring and damper combination, they do not, in actuality, operate in such a manner. Power inefficiencies occur due to pumping the hydraulic fluid, and further losses exist in producing proper forces to actively control and account for machine vibration. Further, by utilizing a fluid displacement generating device, or similar type electrohydraulic servovalve, a bulky package is produced which is difficult to implement to provide a practical actively-controlled machine mount. Still further, inefficiencies result due to "bulging" along nonworking mount axes. "Bulging" is an action which exists such that the walls in particular chambers do not allow for accurate force transmission via the liquid flowing through the particular chamber.

Figures 2A, 2B:
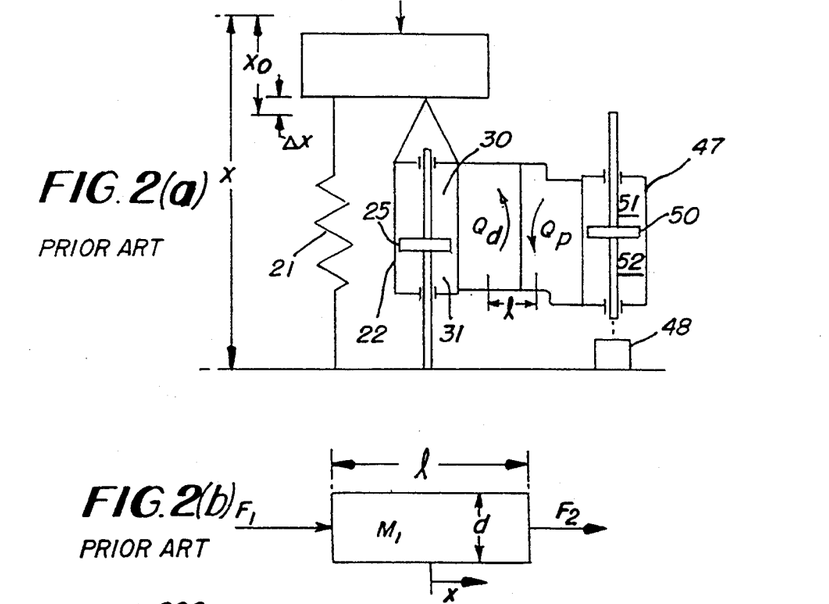
FIG. 2(a) illustrates a conventional actively-controlled machine mount.
FIG. 2(b) is a free body diagram of the length of a fluid tube utilized within a actively-controlled hydraulic machine mount.
Figure 3:
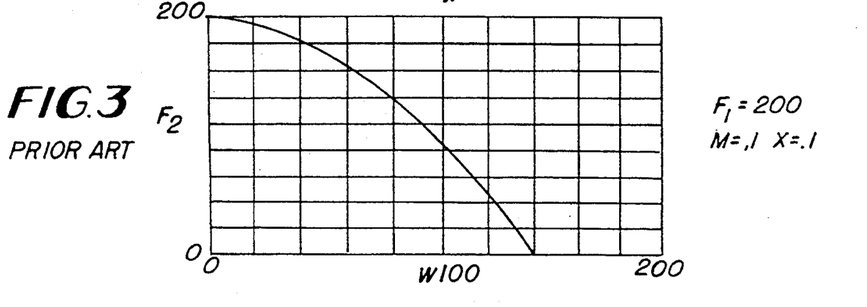
FIG. 3 is a graphical representation illustrating the increasing loss of available force as a function of frequency.

The following analysis indicates the issue regarding pumping fluid in this application. The following description and analysis of fluid pumping will be illustrated with, regard to FIG. 2(a) and 2(b). FIG. 2(a) illustrates a conventional system, showing a particular length of tubing through which fluid must flow. A piston attached to a drive motor can provide a force (F1 as shown in FIG. 2(b)) to push a column of fluid at a particular frequency. The column of fluid has a mass $M_1$ as shown in FIG. 2b). The force, $F_2$ as shown in FIG. 2(b) is the remaining force available to displace a working "bushing" of an active mount. This bushing, for example, can be seen with regard to 3 of FIG. 1. FIG. 3 is a representative curve of the characteristics of a whole series of plots (not shown) showing the effect of the frequency function on causing increasing loss of available force. Clearly, the effect of this loss is not as important at "low" frequencies as it is as "high" frequencies.

OBJECTS AND SUMMARY OF THE INVENTION

In order to alleviate the effect of wiring loss of force at increasing frequencies, the mass of the fluid being pumped or the length (for a given tube diameter) of fluid travel should be reduced. The resistance of the fluid transmission path should also be reduced.

It is therefor an object of the present invention to alleviate the effect of the loss of force at high frequencies by minimizing both the mass of fluid being pumped and the mass and velocity of fluid travel.

In order to minimize the mass of the fluid being pumped, the shortest possible passageway length for a given cross-sectional area should be utilized as well as the smallest volume in both the mount chambers and the cylinder/piston chambers.

Therefore, it is a further object of the present invention to utilize passageways as large in diameter as possible in order to minimize the velocity of pumping fluid.

It is therefore a further object of the present invention to utilize passageways which are both short and of large cross sectional area to reduce any loss of force exerted by the fluid pump.

It is a further object of the present invention to collocate the mount and driver in the same housing to achieve an optimal solution. This allows the lengths of passageways to be as short as possible. Also, the passageways can be large in diameter and not unduly contribute to the overall package size as they would in a noncollocated arrangment.

It is a further object of the present invention to provide a collocated housing including a fluid displacement generating device and further including short and wide fluid transfer passageways for providing forces to an engine to permit the forces to be transmitted from a machine to a support while decoupling the transmission of dynamic vibrational forces.

Still further, it is an object of the present invention to provide, in this collocated system, first and second fluid chambers surrounded by a resiliant rubber material configured to minimize the affect of "bulging" in non-working areas and to provide proper force transfer to an engine mount, while providing a rigid steel frame in a second area of the collocated housing to allow proper force transfer to .and from the respective first and second chambers, via an actively controlled fluid displacement and generating device.

It is a still further object of the present invention to provide an actively-controlled machine mount which minimizes power loss in the mount system due to fluid mass and pumping velocity.

It is a still further object of the present invention to provide an actively-controlled machine mount which allows minimization of power loss through an optimal use of short, large diameter passageways through which fluid is forceably pressured, in a steel rigid chamber, such that the forces from the fluid are exerted on a rubber-like material to counteract dynamic forces exerted from an engine or other type of machine.

It is yet another object of the present invention to prevent "bulging" of an elastomeric element in non-working directions by providing either fabric or metal reinforcements in the areas of the assembly concerning these non-working directions.

The objects of the present invention are fulfilled by an apparatus for actively controlling and compensating for static and dynamic forces exerted from a vibrating element. The apparatus includes a fluid filled force producing chamber, including a force producing means, for generating force through flow of the fluid in response to detection of relative static and dynamic forces exerted by the vibrating elements. The apparatus further includes first and second fluid filled force exertion chambers, each connected to the force producing chamber through a first and second short, wide passageway, respectively, each of the first and second fluid-filled force exertion chambers receiving a force equal in magnitude but opposite in phase by the other of the force exertion chambers, and exerting the received force to thereby compensate for the static and dynamic forces exerted by the vibrating element. Preferably, the force exertion chambers, force producing chamber and passageways are housed within a single self-contained enclosure.

These and further objects of the invention will become more readily apparent from the understanding of the preferred embodiments with reference to the following drawing figures.

BRIEF DESCRIPTION OF THE DRAWINGS

The present invention will become more fully understood from the detailed description given hereinbelow and the accompanying drawings which are given by way of illustration only and are not intended to limit the present invention, and wherein.

The above-mentioned drawings will be described in detail in the following description.

DETAILED DESCRIPTION OF THE PREFERRED EMBODIMENT

Figure 4:
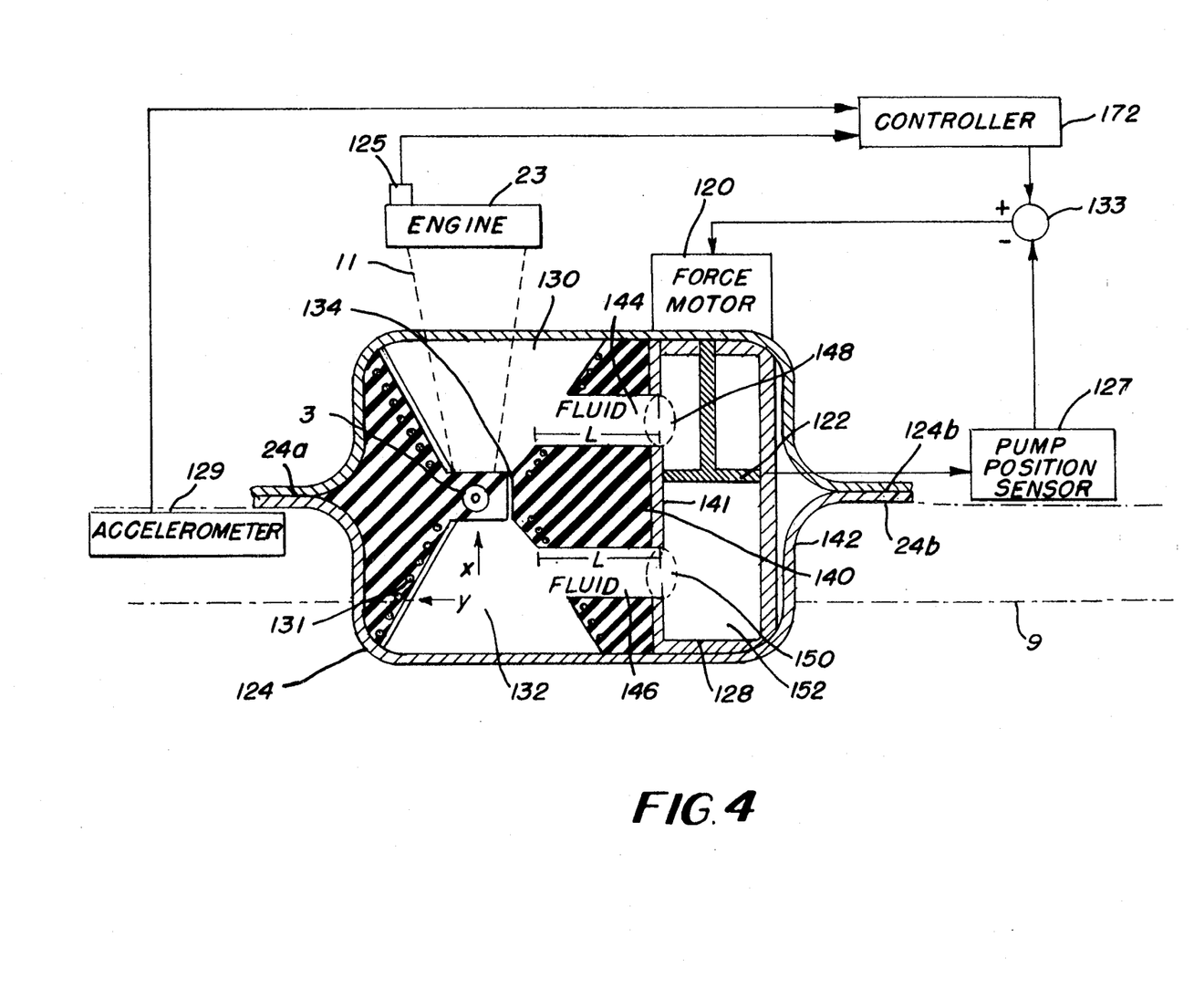
FIG. 4 illustrates a single self-contained actively-controlled machine mount of a first preferred embodiment of the present invention.

FIG. 4 illustrates the first embodiment of the present invention., namely a single, self-contained actively-controlled vibrating element mount which permits static force to be transmitted from the vibrating element, i.e., a machine, motor, or engine, for example, to a support through a spring-and-damper type arrangement while decoupling the transmission of dynamic vibrational forces. This particular embodiment of the present invention allows minimization of power loss in the mount system due to fluid mass and pumping velocity. The single, self-contained actively-controlled vibrating element mount of Figure-4 is illustrated by element 142. The outer casing of the device, or "clam shell", allows the entire mount to be housed within a single unit. This single self-contained unit is of a three-dimensional generally rectangular shape, and contains an outer wall, 124, which may perferably be made of steel, but could be made with a rubber-like material. This outer wall serves to absorb any residual force exerted by an engine, or other similar type vibrating element.

The engine, or vibrating element 23, is attached to bracket 11. The bracket 11 may be one, for example, which is attached to each of the four corners of the engine to thus support the engine. One particular bracket 11 connected to one particularly actively-controlled vibrating element mount, will be described with regard to the present invention. It should remain clear, however, that the present invention is not limited to one such actively controlled vibrating element mount connected to one engine bracket. This is merely for illustrative purposes. It should be known that a number of actively-controlled vibrating element mounts may be supplied, one for each of the engine brackets, respectively. In a rear-wheel chassis design studied by the present inventors, there was potential for placement of three actively-controlled vibrating element mounts. It should be noted, however, that experimental evidence suggested that front mounts were far more critical to the frame vibration reduction than the rear engine mount. Roughly eighty percent of the engine weight is supported on the front engine mounts. For this reasons, as well as practical considerations, such as cost and complexity, in a further preferred embodiment, independent actively-controlled vibrating elements mounts need be utilized at the front two mount locations only.

The engine bracket 11 is one, in a preferred embodiment, of a wishbone shape. The top of the wishbone shape is connected to the engine. The two bottom parts of the wishbone shape in this preferred embodiment are each connected to a bushing 3 on alternating sides of the self-contained actively-controlled vibrating element mount of FIG. 4, at a location of substantially the midpoint of the height dimension of the self-contained mount as shown by 3 in FIG. 4, for example. Bushing 3 is located between the first and second symmetrical chambers, 130 and 132, of the self-contained mount, such that force can be equally applied to the bushing from the top or bottom of the bushing in a uniaxial manner, to thereby adequately support the vibrating element as well as decouple the transmission of dynamic vibrational forces. While chambers 130, 132 are symmetrical in the preferred embodiment, they need not be so. Still further, the self-contained mounts 24a, 24b are further bracketed to the frame as at 124b or chassis 9 of the device housing the vibrating element. Further, the bushing 3 is connected via an axle (not shown) to a second bushing on the opposite side of the mount. The second bushing, similar to the first bushing 3, is then connected to the second wishbone leg of the engine bracket 11. Therefore, the bushing 3 more adequately receives the force from the engine, including both the static force transmitted due to the weight of the engine, as well as the dynamic vibrational forces attributable to motion of the engine and controlled by the active vibration control system.

The self-contained mount is substantially rectangular in shape in the X and Y dimensions illustrated and further extends in the Z direction (not shown) a distance substantially equivalent to that illustrated corresponding to the X direction. The clam shell or outer periphery 124 of the mount is formed of steel which may be coated with a rubber-like material and which is of sufficient stiffness to maintain constant rigidity of the clam shell while still allowing adequate distribution of the forces through the mount to compensate for the dynamic vibrational forces of the vibrating element, as well as absorbing static forces transmitted from the vibrating element.

FIG. 4 further illustrates that the self-contained device includes the cubic outer housing and a single fluid containing inner cavity including substantially three primary chambers. The main chambers within the mount are illustrated by a first uniaxial force exertion chamber 130 and a second uniaxial force exertion chamber 132. The chambers 130 and 132 are fluid-filled and substantially equivalent in shape and volume. The fluid is a substantially incompressable liquid. The chambers 130 and 132 are designed to be inverted in shape such that the first and second force exerting chambers form inverted frusto-conical force exerting chambers converging on the axis of bushing 3. Thus, these juxtaposed chambers of inverted frusto-conical shape can apply force to the bushing 3 in a uniaxial manner. While in the preferred embodiment these chambers are frusto-conical, any chamber shape may be utilized with optimization of uniaxial force transmission being a primary objective. For example, the chambers 130, 132 may be frusto-pyramidal or cylindrical in the alternative.

First and ;second fluid passageways 144, 146 exist in the inner cavity.. Force is actively transferred to the first and second force exerting chambers respectively, via these passageways to compensate for the vibrational forces of the vibrating element. These passageways are, in the preferred embodiment, cylindrical, of large diameter and short length. Finally, a fluid-filled cylinder 152 is contained in the cavity through which compensational forces are generated via a short-stroke piston 122 and a motor 120. Motor 120 may be any compatible motor such as a force or displacement electric motor or other actuator converting control signals into hydraulic forces. This fluid-filled force generating chamber is preferably of a cylindrical shape, as are passageways 144 and 146. However, the chambers and passageways are not limited to cylinders and may be modified to suit the needs of one of ordinary skill in the art. The force generating chamber 152 also includes a steel sleeve 128 around the periphery of the cylinder, to ensure rigidity of the pumping chamber and good sealing properties such that use of the short-stroke piston 122 operates properly and efficiently. The steel sleeve 128 extends around the periphery of the cylinder 152, but does not cover passageways 144 and 146. The openings of the passageways are wide circular openings 148 and 150, and serve to allow force transfer to chambers 130 and 132, and thus are not steel covered and therefore remain open. The self contained cavity is separated into the various chambers and passageways by an inner rubber material 140. The rubber material may be hollow rubber or solid rubber.

The force motor or any similar type actuating device, is actuated so as to operate the piston at harmonic intervals corresponding to the vibration of the vibrating element. Thus, the pump piston 122 may be selectively operated so as to move the pump piston upwardly or downwardly as desired. The motor 120 should be capable of selectively moving the pump piston relative to its force generating cylinder in the direction desired and at the desired, frequency and amplitude. Preferably, the pump-piston operates within cylinder 152 between passageways 144 and 146 to produce a short stroke within the fluid-filled chamber 152 to generate and transfer force to chambers 130 and 132 which are adapted to convert hydraulic force into mechanical force through the action of pump piston 122.

The control system utilized to actuate the motor 120 contains an accelerometer 129 mounted on the frame 9 to sense vertical acceleration of the support, and arranged to supply suitable input signal to a controller 172. A frequency sensor monitoring motor harmonies (typically a fly wheel tachometer 125) is mounted to the vibrating element 23 to sense the frequency of the vibration of the vibrating element 23, and to supply another input signal to controller 172. The controller 172 may optionally be arranged to supply a suitable output signal indicative of the desired position of pump piston 122 relative to its, cylinder 152, as a positive input to a summing point 133. A residual pump piston position sensor 127 may be arranged to sense the actual position of the pump piston 122 and to supply an appropriate signal as a negative input to the summing point 133. These two input signals are summed in summing point so as to drive the pump piston 122 to produce a force signal of a desired polarity, magnitude, frequency and phase. However, the pump piston position sensor may be removed such that the controller 172 can provide a force output signal independent of pump piston position. In the preferred embodiment, however., no such position control is utilized and the pump piston position sensor 127 and summing point 133 are eliminated. An example of the control system used in the preferred embodiment to drive the motor of the present invention is shown in U.S. Pat. No. 4,878,188, issued to Ziegler, Jr. on Oct. 31, 1989, the disclosure of which is incorporated herein by reference. However, any control technique which minimizes below mount force transmission may be used according to the teaching of the present invention.

As previously stated, chambers 130 and 132 are force applying chambers of a frusto-conical shape, inverted with respect to one another. The frusto-conical shape of the force activating chambers allows the force applied by the mount to the engine, to be unidirectional in the X direction, as indicated in FIG. 4. Further, the frusto-conical shape of each of the force activating chambers 130 and 132 is such that the largest base of the cone is furthest from the bushing 3, in each of the chambers. Thus, the frusto-cone containing a short and a long base, parallel to one another, are inverted so as to juxtapose the short bases of each of the chambers 130 and 132 closest to bushing 3. Thus, the frusto-conical shape allows any force exerted to be exerted in a unidirectional manner at the bushing 3, to compensate for vibrational forces in the engine. A significant feature of this mount design is that forces are controlled in the uniaxial direction while the vibrating element is free to move in all other directions.

A cylindrical orifice or bleedhole 134 is also shown connecting chambers 130 and 132. The orifice 134 acts as a high pass mechanical filter to protect the actuator and may control dynamic forces exerted at very low frequencies dynamic forces exerted at very low frequencies by the vibrating element. It further allows the bleeding of air from the system during initial construction.

The chambers 130 and 132 may further contain a fabric, metal or other material 131 arranged such that it will further channel force in an axial (X) direction towards bushing 3 in each of the chambers 130 and 132. This stiffener 131 should be compliant in the axial (x) direction and stiff in other directions. This stiffener 131, within the walls of the chambers 130 and 132, combined with the chamber shape, allows for enhanced mount efficiency by reducing "bulging" in non-working axes by channeling forces in the working or "x" axis.

The force generating cylinder 152, housing the short-stroke pump piston 122, contains a steel sleeve 128 along the inner wall in closing substantially all of the cylinder 152 except that of openings 148 and 150. These areas 148 and 150 lead to passages 144 and 146 through which force generated by the pump piston is transferred in synchronization with the vibration of the vibrating element via the force motor and previously mentioned control system to the force activating chambers 130 and 132, to thus apply compensatory force to thereby actively control and compensate for engine vibration. When the engine or similar vibrating element is exerting a force downwardly toward the support, the pump piston may be moved so as to simultaneously track or anticipate this force, inhibiting the vibration by matching the velocity of the vibrating element.

Passageways 144 and 146 are short in length (1) and wide in diameter (or cross-sectional area)(D) to transfer force generated from the pump piston in chamber 152 to chambers 130 and 132 as previously described. It is essential to minimize force lost between the initial force (F1) generated by the pump piston, to the final force (F2) generated through chambers 130 and 132 and applied to the vibrating element 23 through bushing 3. The chambers 130 and 132 are surrounded by substantially rubber-like walls such that the chambers operate as if the spring and damper were integrally combined in one unit.

Essentially, via the control system, a piston 122 attached to a force motor 120 can provide a force (F1) from a column of fluid, at a particular frequency. The column of fluid contained within the chambers of the mount, has a mass M. The force (F2) is the remaining force available to displace the bushing 3 of the active mount to actively control the vibrations exerted from the vibrating element. It is desirable to minimize the loss of force, (F1−F2), to maximize force, F2, exerted through the force activating chambers 130 and 132 in the uniaxial (x) direction. To maximize force transferral, the mass of the fluid must be as small as possible and/or the length of fluid travel must be minimized. The forces are dictated by the following equation:

$$F1 - F2 = Ma = -\omega^2 Mx = -\omega^2 \rho Ax \qquad \text{Equation 1}$$

Where
M is the mass of the fluid;
a is acceleration;
$\omega$ is angular frequency;
x is displacement distance;
$\rho$ is a constant; and
A is cross-sectional area of the fluid.

Further, this leads us to the vibrational force needed to actively control the vibrating of the vibrating element, F2, is equal to $F1 + \omega^2 \rho Ax$. F1 is the force available from piston 122 at a given frequency while F2 is the residual force left after the transmission process. Thus, F2 is dictated by the equation:

$$F2 = F1 + \omega^2 \rho Ax. \qquad \text{Equation 2}$$

Therefore, in order to minimize the mass of the fluid being pumped, the shortest possible length of passageways 144 and 146 should be utilized as well as the smallest volume in the passageways as well as the fluid which must be displaced in both the force exerting chambers 130 and 132 and the force producing chamber 152. Further, in order to minimize the velocity of the pumping fluid, the passageways should be as wide in diameter as possible. An optimized solution requires passageways 144 and 146, to be both short and wide to reduce the loss term of equations 1 and 2. Since the force acting chambers and force producing chamber are collocated in a single self-contained housing, the length of the passageways tubes 144 and 146 can be optimized to be as short as possible. Also, the passageways can be large in diameter (D as shown by 148 and 150) so as to not unduly contribute to the overall package size as they would in a non-collocated arrangement. Thus, it is desirable according to the teachings of the present invention, in this first preferred embodiment, that the passageways 144 and 146 of FIG. 4, be as short as possible, and that D, corresponding to the diameters of the passageways 144 and 146, be as large as possible. This allows for minimal pumping velocity of the fluid and further facilitates the smallest fluid mass at that velocity. Thus, the force F2 generated by the piston in cylinder 152 can be transferred and be utilized to act in a uniaxial manner (corresponding to the X direction of FIG. 4) on the bushing 3 with minimal force loss so as to thereby cancel vibrational forces over the frequency range of control, as generated by the vibrating element. Thus, dynamic forces transmitted by the vibrating element through the suspension bracket 11 and overall suspension system and attributable to such high frequency vibration, will be at least reduced and preferably eliminated.

Further, as is shown in FIG. 4, there also exists a orifice or bleed hole 134 which connects the opposing and inverted frusto-conical force acting chambers 130 and 132, and functions as a dampening orifice for extremely low frequencies. This preferably cylindrical orifice 134 connecting chambers 130 and 132 is substantially small in diameter such that it operates primarily at very low frequencies and does not interfere in the force transfer from cylinder 152 to chambers 130 and 132 in the actively controlled frequencies of interest.

The inner rubber 140 segmenting the clam shell into the previously mentioned three chambers, can be made of solid or hollow rubber material as previously described. The material must be sufficiently still enough to maintain rigidity but also flexibile enough, when used with bleedhole 134 to be compliant in the uniaxial direction. The inner rubber material 140 which allows for the division of the single self-contained cavity into the previously mentioned three chambers, also provides for the shape of these chambers. As previously mentioned, chambers 130 and 132 are opposing inverted frusto-conical shaped to allow the channeling of a dynamic compensation forces in a uniaxial direction. The circular openings 148 and 150 leading from the piston cylindrical chamber 152 are substantially circular in shape.

The pump piston 122 is preferably a short stroke piston which operates in sealing contact with the steel sleeve, as shown by 141, to thereby operate between cylindrical openings 148 and 150. Thus, depending on the force exerted by the engine, the piston can provide a compensatory force from cylindrical chamber 152 through the tubular passageways 144 and 146 into chambers 130 and 132, thus apply the proper compensatory force to the engine through bushing 3.

It should be further noted that the design of the device in FIG. 4 and the location of the cylindrical pump piston chamber and the tubular passageways 144 and 146 may be varied. For example, as long as passageways 144 and 146 are essentially the same length and same shape, they may enter chambers 130 and 132 at a variety of angles throughout the device. Further, it should be clear from FIG. 4 that the location of the pump piston and force motor is merely one of design choice and may be varied or would vary to one of ordinary skill in the art. For example, the axis of the pump may be different from the axis of uniaxial displacement (x) of the chambers 130, 132.

Still further, other obvious modifications of the device can further be implemented such that the configuration also allows for the use of a second force motor, if needed, to produce additional force and fluid displacement, separately to each of chambers 130 and 132.

Figure 5:
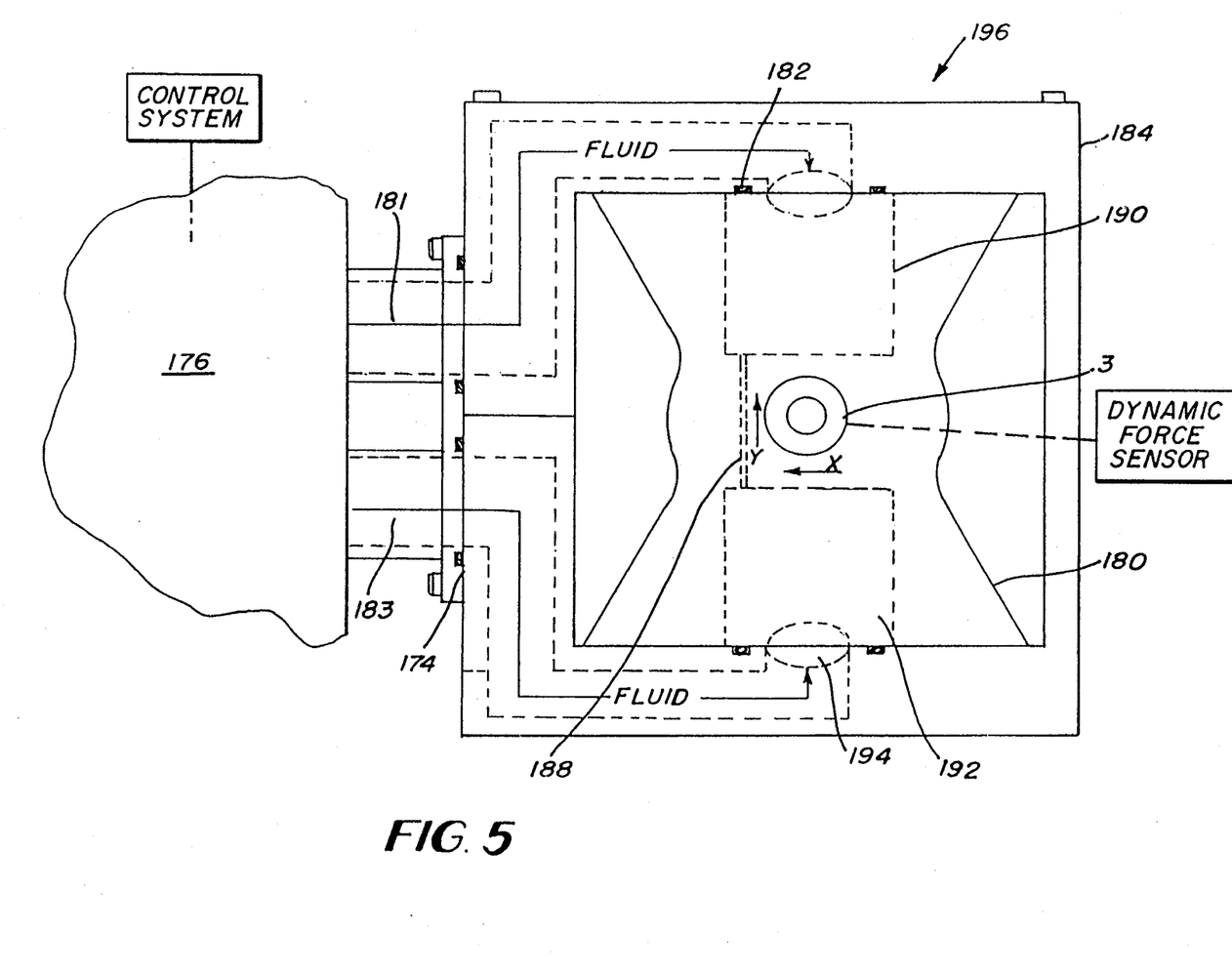
FIG. 5 illustrates an integrally combined actively-controlled machine mount of the second preferred embodiment of the present invention.

In a second preferred embodiment of the present invention, an actively-controlled vibrating mount is shown with regard to FIG. 5. In FIG. 5, an actuator 176 is illustrated which provides the appropriately controlled compensatory pumping force from a control system similar to that previously described with regard to FIG. 4. Such a system, for example that illustrated in U.S. Pat. No. 4,878,188 issued to Ziegler, Jr. on Oct. 31, 1989, may further be utilized to selectively create a desired compensatory force to anticipate the force exerted by the vibrating engine, the anticipating force being of such magnitude, polarity and phase to substantially eliminate the static and dynamic forces transmitted through bushing 3. Further, the forces exerted are arranged to substantially cancel vibrational forces over the frequency range of control. Typically these vibrations are harmonic in nature and are controlled via adaptive techniques. However, once again, any desired technique may be used. Thus, similar to pumping chamber 152, the actuator applies the necessary compensatory force through a first passageway 181 and a second passageway 183. A single piston and motor arrangement may be utilized, similar to that of FIG. 4, or a separate piston and motor arrangement can be utilized for each passageway 181 and 183 such that compensatory forces of equal magnitude and opposite phase are generated through each passageway.

Passageways 181 and 183 are designed to be oval or cylindrical fluid containing cavities within a two piece aluminium bracket 184. The bracket 184 is customized to fit each particular vehicle and is of a substantially cubic shape, somewhat similar to that of the clam shell of FIG. 4.

The bracket 184 is substantially cubic in shape, as previously stated, and provides for an aluminum housing around the actively-controlled vibrating element mount. An inner housing lies substantially within the cubic aluminum bracket and includes a rubber mount 180. The rubber mount is shaped substantially as a first and second integrally connected opposed frusto-conical shaped chambers, with the base of the cones attached to the top and bottom of aluminum bracket 184, and the smaller, in area, tops of the frusto-conical shaped chambers converging on the actual bushing 3. The rubber mount 180 surrounds bushing 3 in the x and y direction as illustrated in FIG. 5. Thus, as a force from a vibrating element is transmitted through bushing 3, compensatory forces can be generated via actuator 126 and travel through oval passageways 181 and 183 which may be of any desired cross-section but which are oval in the preferred embodiment such that they provide the proper compensatory force through bushing 3 and thus control the vibrations of the vibrating element.

The oval passageways 181 and 183 provide passageways analogous to 144 and 146 of FIG. 4 through which the compensity force is generated. The passageways are oval in shape, as previously mentioned, such that the length L in passageways 181 and 183, is substantially minimized to be as short as possible to minimize the mass of fluid pumped, similar to that previously described with regard to FIG. 4. Further, in order to minimize the velocity of the pumping fluid, the passageways are configured to be as wide in diameter as possible, as shown at entrance portions 194 and 196, prior to the fluid entering force activating chambers 190 and 192, the chambers being analogous to chambers 130 and 132 of FIG. 4. Still further, an orifice 188 exists in a uniaxial direction connecting force activating chambers 190 and 192 to act in a similar manner as orifice 134 of FIG. 4.

Further, o-ring seals 182 exist to ensure no pressure is lost between chambers 190 and 192 and oval passageways 181 and 183, as well as o-ring seals 174 ensuring a fluid tight connection between the actuator 176 and the actual bracket 184.

FIG. 5 further shows that the outer chamber containing passageways 181 and 183 is integrally combined in one unit with rubber mount 180. Thus the chambers 190 and 192 can receive compensatory force via the fluid filled passageways 181 and 183 in a short, compact device, from actuator 176. Thus, loss of force is minimized.

As can be seen by FIG. 5, the actuator provides the proper compensatory force through either of the transmission passageways 181 and 183, the length of the fluid filled passageways, i.e. the force loss, is minimized and the velocity of pumping fluid is further minimized by the large diameter openings 194 and 196. This occurs in a similar manner as previously described regarding FIG. 4., Thus, by housing the force traveling passageways 181 and 183 within the bracket 184, integral with rubber mount 180, space and area within a vehicle, for example, may also be conserved.

It should be clear to one of ordinary skill in the art that actuator 176 may comprise a dual chamber pump and drive motor as exists in FIG. 4, or may contain multiple force motors and piston devices, one for each of the oval passages 181 and 183 to apply the appropriate force, equal in magnitude and opposite in phase, through each of the passageways. Similarly, it should be noted that one of ordinary skill in the art could construct the force exerting chambers 190 and 192 in an optimal shape so as to maximize and isolate the force exerted on bushing 3 in a uniaxial direction, similar to that of the first embodiment of FIG. 4. Still further, as in the case of FIG. 4, it should be noted that mount 180 is of a rubber material so as to be resiliant enough to allow flexibility in the desired direction to transfer force, but further rigid in other directions so as to avoid any problems such as "bulging" of the mount and non-working directions. Force, similar to that described in the previous embodiment, is exerted on the bushing 3 in a uniaxial direction. It is further noted that the rubber mount may be made of any elastomeric element. It should also be noted that upon utilization of a first and second force motor and pump piston assembly, to .supply force through passageways 181 and 183, that the proper compensatory force would be generated by .asserting a positive half of the proper force through first one of passageways 181 and 183 and asserting an essentially equal in magnitude force, opposite in phase, through the other passageways 181 and 183. Thus, the two chambers, 190 and 192, operating in synchronism via the actuator 176, would provide the proper compensatory force for stabilization of the vibrating element through bushing 3. Chamber 190 and 192 are arranged in relationship with bushing 3 so as to convert hydraulic force to mechanical force. Similarly, if one of ordinary skill in the art were to utilize two short-stroke pump piston assemblies in the first embodiment in the present invention as shown in FIG. 4, a similar positive and negative force would be applied through passageways 144 and 146 to provide the proper compensatory force and the uniaxial direction for the vibrating element through bushing 3. Operation of the system of the second embodiment occurs similar to that of the first embodiment and thus such a description is not included.

Figure 6A:
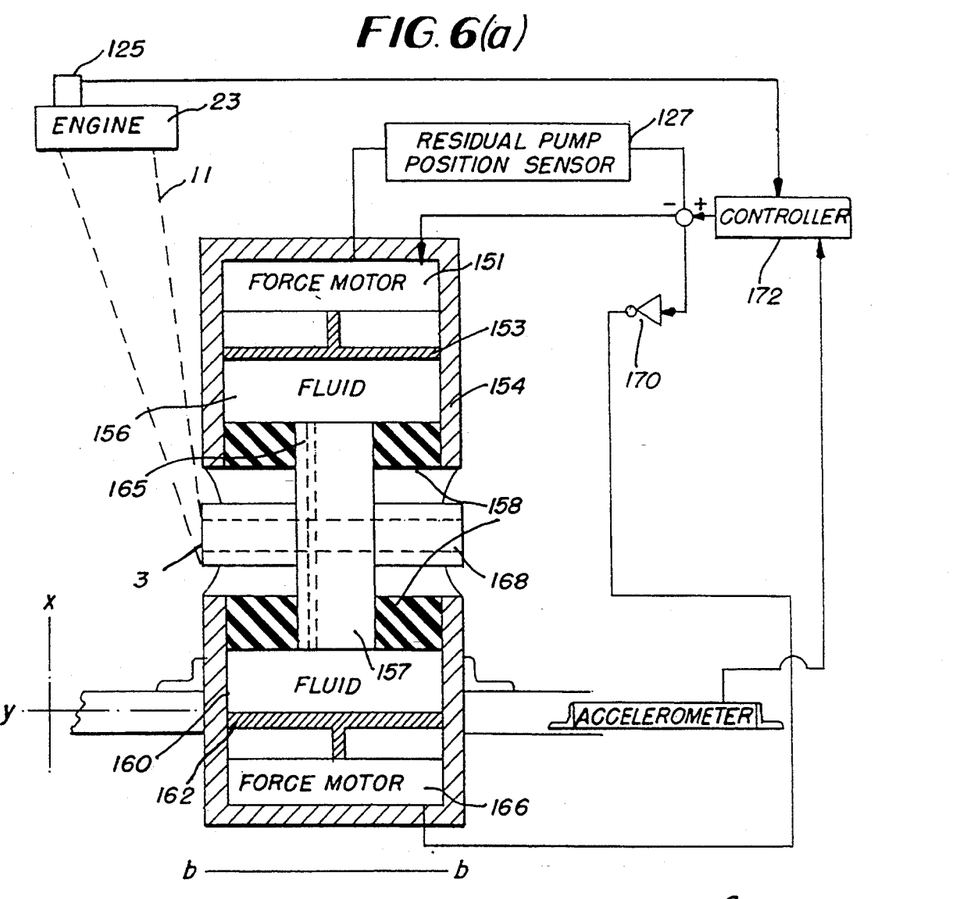
FIG. 6(a) illustrates sectional side views of a third embodiment of the present invention.
Figure 6B:
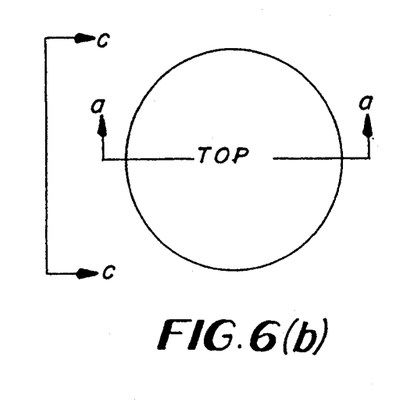
FIGS. 6(b) and 6(c) are top and side views, respectively, of the third embodiment of FIG. 6(a).
Figure 6C:
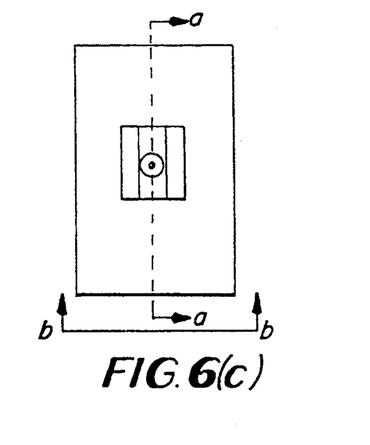

A third preferred embodiment of the present invention is shown with respect to FIGS. 6(a), 6(b) and 6(c) illustrating various views of the three dimensional two cavity, self-contained actively-controlled vibrating element mount. The mount in this embodiment is substantially cylindrical in shape (but may be of any desired cross-section) and comprises a single self-contained unit having first and second cavities. This mount is constructed of a steel body 154 having first and second cylindrical chambers 156, 160, including rubber elements, 158, which are attached to the metal bushing 3 through a coupling rod 157. The bushing 3 is connected to a support 11 for a vibrating element 23 via an inner metal rod, 168. This inner metal rod 168 and bushing 3 intersect rod 157 to thus allow compensatory force generated from the first and second chambers to transfer to the bushing 3 to thus control transfer of vibration from the vibrating element 23.

Within the first and second steel body cylindrical chambers 156, 160, exist a first and second drive motors 151 and 166 which may be suitable force or displacement motors, and first and second short-stroke pump pistons, 153 and 162. Fluid is present in each of the cylindrical chambers 156 and 160 such that force created through the motor and piston combination can be transmitted to the bushing 3 in a similar manner as previously described with regard to FIG. 4, such that a compensatory force can be applied to metal bushing 3 and thus control vibrating element 23. Further, an elastomeric material 158 is provided at the ends of each chamber 156, 160, opposite to that of the motors. This elastomeric material 158 aids in uniaxial force transfer of the force generated in each cavity to adequately compensate for the vibratory force of the vibrating element through metal bushing 3. The elastomeric material 158 and the steel body constrain fluid expansion in the non-working axes and provide force transfer only in the working axis, through coupling rod 157. Further, similar to that of FIG. 4, an orifice 165 is provided.

The use of two force motors in this type of package assembly for the mount requires only electrically external connections to a controller 172. Inverter 170 schematically represents the phase inversion applied to one of said motors 151, 166 and exists such that the compensatory forces can be applied equal in magnitude and opposite in phase, by motors 151 and 166 such that the two chambers 156 and 160 allow the transfer of force in a push-pull type of motion. Thus, the proper compensatory force can be achieved through metal bushing 3.

As can clearly be seen in the operation of the self-contained, two cavity actively-controlled vibrating element mount shown in FIGS. 6(a), 6(b) and 6(c), a less bulky package is provided which sufficiently reduces the amount inefficiencies due to "bulging" in non-working axis.

It should further be noted that in FIGS. 6(a), 6(b) and 6(c), the length of the force activating cylindrical chambers 156 and 160 is clearly minimized. Thus, the mass of the fluid being pumped is minimized through the shortest possible tube length to thereby achieve optimum results as previously described regarding FIG. 4. Further, in this embodiment of the present invention, the need for passageways 144 and 146 of FIG. 4, for example, is essentially eliminated due to the direct application of the force from the motor and piston combination 151 and 153, for example, to the metal bushing 3. There is no intermediate length of a passageway through which the fluid must pass which may allow for loss of force, as previously illustrated with regard to Equation 1. Still further, cylindrical chambers 156 and 160 are short in length and also extremely wide in diameter. Thus, the velocity of the pumping fluid is further minimized for reasons similarly given regarding FIG. 4. Thus, the configuration of the present invention as illustrated in FIGS. 6(a) to 6(c) illustrates a self-contained two cavity or two chamber mount which allows minimization of power loss through optimal use of short, large diameter cavities or chambers. This configuration realizes the utilization of two force motors and their application.

From the above-described embodiments of the present invention, it is apparent that the present invention may be modified as would occur to one of ordinary skill in the art without departing from the spirit and scope of the present invention which should be defined solely by the appendant claims. Changes and modifications of the system contemplated by the present preferred embodiments will be apparent to one of ordinary skill in the art.

What is claimed is:

1. An active hydraulic system for use in an active system controlling and compensating dynamic forces exerted from a vibrating element, comprising:

a rigid outer housing means;

first and second exertion chambers within said housing means for converting hydraulic to mechanical force; and compensatory force generating means operatively connected to said rigid outer housing means for converting an electrical control signal related to residual transmitted force to hydraulic force, said compensatory force generating means generating first and second simultaneously acting compensatory forces of equal magnitude but opposite polarity via flow of fluid through first and second passage means integrally located within said rigid outer housing means and extending to the first and second force exertion chamber within said outer housing means, respectively.

said compensatory force generating means generating said first and second forces through flow of said fluid in response to detection of the residual of the sum of the dynamic forces exerted by the vibrating element and the compensatory force exerted by the system and said first and second force exertion chambers exerting said first and second forces generated by said force generating means to thereby compensate for the dynamic forces exerted by the vibrating element, minimize pumping fluid loss and to impart energy into the system.

2. The system of claim 1 wherein the length of said first and second passage means is minimized to as to minimize the mass of the fluid flowing from said force generating means to said first and second force exertion chambers and thus minimize loss of force during transfer of the fluid.

3. The system of claim 2 wherein the cross sectional area of each of said first and second passage means is maximized so as to minimize the velocity of the fluid flowing from said force generating means to said first and second force exertion chambers and thus minimize loss of force during transfer of the fluid.

4. The system of claim 1, wherein the first and second force exertion chambers exert said compensatory forces in a uniaxial direction to a bushing operatively connected to the vibrating element, to compensate for the static and dynamic forces exerted by the vibrating element.

5. The system of claim 1, wherein said first and second force exertion chambers are connected via a small cylindrical passageway to enable compensation of the dynamic forces exerted at very low frequencies.

* * * * *